(12) United States Patent
Mizon et al.

(10) Patent No.: US 7,813,857 B2
(45) Date of Patent: Oct. 12, 2010

(54) POWER TRANSFER ASSEMBLY WITH TORQUE SENSORS AND TORQUE CONTROL SYSTEM

(75) Inventors: Richard Mizon, Fayetteville, NY (US); Malcolm E. Kirkwood, Livonia, MI (US); Brian Vaughn, Byron, MI (US); Sankar K. Mohan, Jamesville, NY (US); Eric A. Bansbach, Fayettesville, NY (US)

(73) Assignee: MAGNA Powertrain USA, Inc., Troy, MI (US)

( * ) Notice: Subject to any disclaimer, the term of this patent is extended or adjusted under 35 U.S.C. 154(b) by 0 days.

(21) Appl. No.: 12/328,073

(22) Filed: Dec. 4, 2008

(65) Prior Publication Data

US 2009/0082934 A1   Mar. 26, 2009

Related U.S. Application Data

(63) Continuation of application No. 11/757,422, filed on Jun. 4, 2007, now Pat. No. 7,491,145.

(60) Provisional application No. 60/814,764, filed on Jun. 19, 2006.

(51) Int. Cl.
  *F16D 23/00* (2006.01)
  *G06F 17/00* (2006.01)

(52) U.S. Cl. ........................ 701/68; 192/54.1

(58) Field of Classification Search ............ 701/68; 192/54.1; 73/862.333; 477/174
See application file for complete search history.

(56) References Cited

U.S. PATENT DOCUMENTS

| 5,285,691 | A | | 2/1994 | Baer | |
|---|---|---|---|---|---|
| 5,348,517 | A | | 9/1994 | Dick | |
| 5,358,084 | A | | 10/1994 | Schramm | |
| 5,407,024 | A | * | 4/1995 | Watson et al. | 180/248 |
| 5,423,235 | A | | 6/1995 | Botterill et al. | |
| 5,992,243 | A | * | 11/1999 | Leeper | 73/862.31 |
| 6,289,748 | B1 | | 9/2001 | Lin et al. | |
| 6,330,833 | B1 | * | 12/2001 | Opie et al. | 73/862.333 |
| 6,341,534 | B1 | * | 1/2002 | Dombrowski | 73/862.333 |

(Continued)

FOREIGN PATENT DOCUMENTS

DE   3626025 A1   3/1987

(Continued)

*Primary Examiner*—Thomas G Black
*Assistant Examiner*—Wae Louie
(74) *Attorney, Agent, or Firm*—Harness, Dickey & Pierce, P.L.C.

(57) ABSTRACT

A transfer case for a motor vehicle having an input shaft, a first output shaft, a second output shaft, a clutch, a transfer mechanism, a sensor portion and a magnetoelastic torque sensor. The clutch has a clutch pack and a thrust mechanism that is configured to exert an engagement force on the clutch pack. The clutch pack has a first portion, which is rotatably driven by either or both of the input shaft and the first output shaft, and a second portion that is supported for rotation relative to the first portion. The transfer mechanism couples the second portion of the clutch pack to the second output shaft. The sensor portion is coupled to the first or second output shaft and is at least partially formed of a magnetoelastic material. The magnetoelastic torque sensor is disposed about and radially in-line with the sensor portion.

10 Claims, 7 Drawing Sheets

U.S. PATENT DOCUMENTS

| | | | |
|---|---|---|---|
| 6,450,921 B1 * | 9/2002 | Glab et al. | 477/174 |
| 6,467,360 B1 * | 10/2002 | Bogdanov | 73/862.333 |
| 6,487,925 B2 * | 12/2002 | Fischer et al. | 74/337 |
| 6,808,053 B2 * | 10/2004 | Kirkwood et al. | 192/84.6 |
| 6,929,518 B1 | 8/2005 | Sawyer et al. | |
| 6,951,145 B2 * | 10/2005 | Kilmartin | 73/862.333 |
| 7,101,310 B2 | 9/2006 | Smith et al. | |
| 7,125,364 B2 * | 10/2006 | Cring | 477/174 |
| 7,308,835 B2 * | 12/2007 | Cripe | 73/862.333 |
| 7,311,629 B2 | 12/2007 | Vomehm et al. | |
| 7,350,425 B2 | 4/2008 | Cripe | |
| 7,491,145 B2 * | 2/2009 | Mizon et al. | 475/206 |
| 2009/0082934 A1 * | 3/2009 | Mizon et al. | 701/68 |

FOREIGN PATENT DOCUMENTS

| | | |
|---|---|---|
| EP | 0076148 A1 | 4/1983 |
| EP | 0231665 A1 | 8/1987 |
| EP | 0313371 A2 | 4/1989 |
| JP | 58012827 A | 1/1983 |

* cited by examiner

POWER TRANSFER ASSEMBLY WITH TORQUE SENSORS AND TORQUE CONTROL SYSTEM

CROSS-REFERENCE TO RELATED APPLICATIONS

This application continuation of U.S. patent application Ser. No. 11/757,422, filed on Jun. 4, 2007, now U.S. Pat. No. 7,491,145 which claims the benefit of U.S. Provisional Application No. 60/814,764, filed on Jun. 19, 2006. The disclosure of the above applications are incorporated herein by reference.

INTRODUCTION

The present invention generally relates vehicle drivelines and, more particularly, to a vehicle driveline with a dynamic traction control system for controlling the distribution of torque between the front and rear drivelines of a four wheel drive vehicle.

Due to increased consumer demand for four-wheel drive vehicles, a plethora of different power transfer systems are currently utilized for directing power (i.e., drive torque) to all four wheels of the vehicle. For example, it is known to use a "full-time" power transfer system having a transfer case equipped with a center differential that functions to permit inter-axle speed differentiation while transferring drive torque to both front and rear drivelines. To minimize loss of traction due to wheel slippage, many full-time transfer cases are also equipped with a clutch assembly for limiting speed differentiation and biasing the torque transferred across the center differential. Such full-time transfer cases are disclosed in commonly-owned U.S. Pat. No. 5,697,861 to Wilson and U.S. Pat. No. 5,702,321 to Bakowski et al., the disclosures of which are hereby incorporated by reference as if fully set forth in detail herein, which are respectively equipped with mechanically-actuated and hydraulically actuated clutch assemblies for controllably modulating the drive torque delivered across the center differential to the front and rear drivelines.

It is also known to use "on-demand" power transfer systems for automatically directing power to the non-driven wheels, without any input or action on the part of the vehicle operator, when traction is lost at the driven wheels. Modernly, the "on-demand" feature is incorporated into the transfer case by replacing the mode shift mechanism with a clutch assembly that is interactively associated with an electronic control system and a sensor arrangement. During normal road conditions, the clutch assembly is maintained in a non-actuated condition such that drive torque is only delivered to the driven wheels. However, when the sensors detect a low traction condition at the driven wheels, the clutch assembly is automatically actuated to deliver drive torque "on-demand" to the non-driven wheels. Moreover, the amount of drive torque transferred through the clutch assembly to the non-driven wheels can be varied as a function of specific vehicle dynamics, as detected by the sensor arrangement. One example of such an "on-demand" power transfer system is disclosed in commonly-owned U.S. Pat. No. 5,323,871 to Wilson et al., the disclosure of which is hereby incorporated by reference as if fully set forth in detail herein, wherein the electronically-controlled clutch assembly is operable for automatically controlling the amount of drive torque transferred to the non-driven wheels as a function of the wheel speed difference (i.e., the wheel slip) between the driven and non-driven wheels.

On-demand four-wheel drive systems are able to provide enhanced traction and stability control and improved operator convenience since the drive torque is transferred to the secondary driveline automatically in response to lost traction of the primary driveline. An example of an actively-controlled on-demand transfer case is shown in commonly-owned U.S. Pat. No. 5,363,938, the disclosure of which is hereby incorporated by reference as if fully set forth in detail herein. The electronically controlled clutch assembly of such actively controlled on-demand transfer cases is typically controlled on an adaptive basis by an electronic control unit in response to instantaneous vehicular operating characteristics detected by a plurality of vehicle sensors. Commonly, the electronic control unit will control primarily or exclusively based on a differential between the speed of an element of the front driveline and the speed of an element of the rear driveline. Typical elements are the front and rear prop shafts or the front and rear wheels.

Rather than rely on speed differentials, it would be preferable in some situations to additionally or alternatively control the operation of the electronically controlled clutch assembly based on the amount of torque that is being transmitted to one or both of the front and rear drivelines.

SUMMARY

In one form, the present teachings provide a transfer case for a motor vehicle. The transfer case can include an input shaft, a first output shaft, a second output shaft, a clutch, a transfer mechanism, a first magnetoelastic torque sensor and a second magnetoelastic torque sensor. The input shaft is adapted to be coupled to an output of a transmission. The first output shaft is adapted to be coupled to a first input of a first driveline and includes a first sensor portion that is at least partially formed of a magnetoelastic material. The second output shaft is adapted to be coupled to a second input of a second driveline and includes a second sensor portion that is at least partially formed of a magnetoelastic material. The clutch has a clutch pack and a power-operated clutch actuator that is operable for exerting a clutch engagement force on the clutch pack. The clutch pack has a first portion which is rotatably driven by one of the input shaft and the first output shaft and a second portion that is supported for rotation relative to the first portion. The transfer mechanism couples the second portion of the clutch pack to the second output shaft. The first magnetoelastic torque sensor is disposed about a portion of the first output shaft and is radially aligned with the first sensor portion. The second magnetoelastic torque sensor is disposed about a portion of the second output shaft and is radially aligned with the second sensor portion.

In another form, the present teachings provide a method for controlling operation of a transfer case in a motor vehicle. The method includes: providing the above-described transfer case; producing a first sensor signal that is representative of a magnitude of torque transmitted through the first output shaft; producing a second sensor signal that is representative of a magnitude of torque transmitted through the second output shaft; and controlling actuation of the power-operated clutch actuator in response to the first and second sensor signals.

In yet another form, the present teachings provide a transfer case for a motor vehicle. The transfer case can include an input shaft, a first output shaft, a second output shaft, a clutch, a transfer mechanism, a sensor portion and a magnetoelastic torque sensor. The input shaft is adapted to be coupled to an output of a transmission. The first output shaft is adapted to be coupled to a first input of a first driveline. The second output shaft is adapted to be coupled to a second input of a second driveline. The clutch has a clutch pack and a thrust clutch actuator. The clutch pack has a first portion which is rotatably driven by either or both of the input shaft and the first output shaft, and a second portion that is supported for rotation relative to the first portion. The clutch actuator is operable for exerting a clutch engagement force on the clutch pack. The transfer mechanism couples the second portion of the clutch pack to the second output shaft. The sensor portion is coupled to one of the first and second output shafts and is at least partially formed of a magnetoelastic material. The magnetoelastic torque sensor is disposed about a portion of the one of the first and second output shafts radially in-line with the sensor portion.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE VARIOUS EMBODIMENTS

Figure 1:
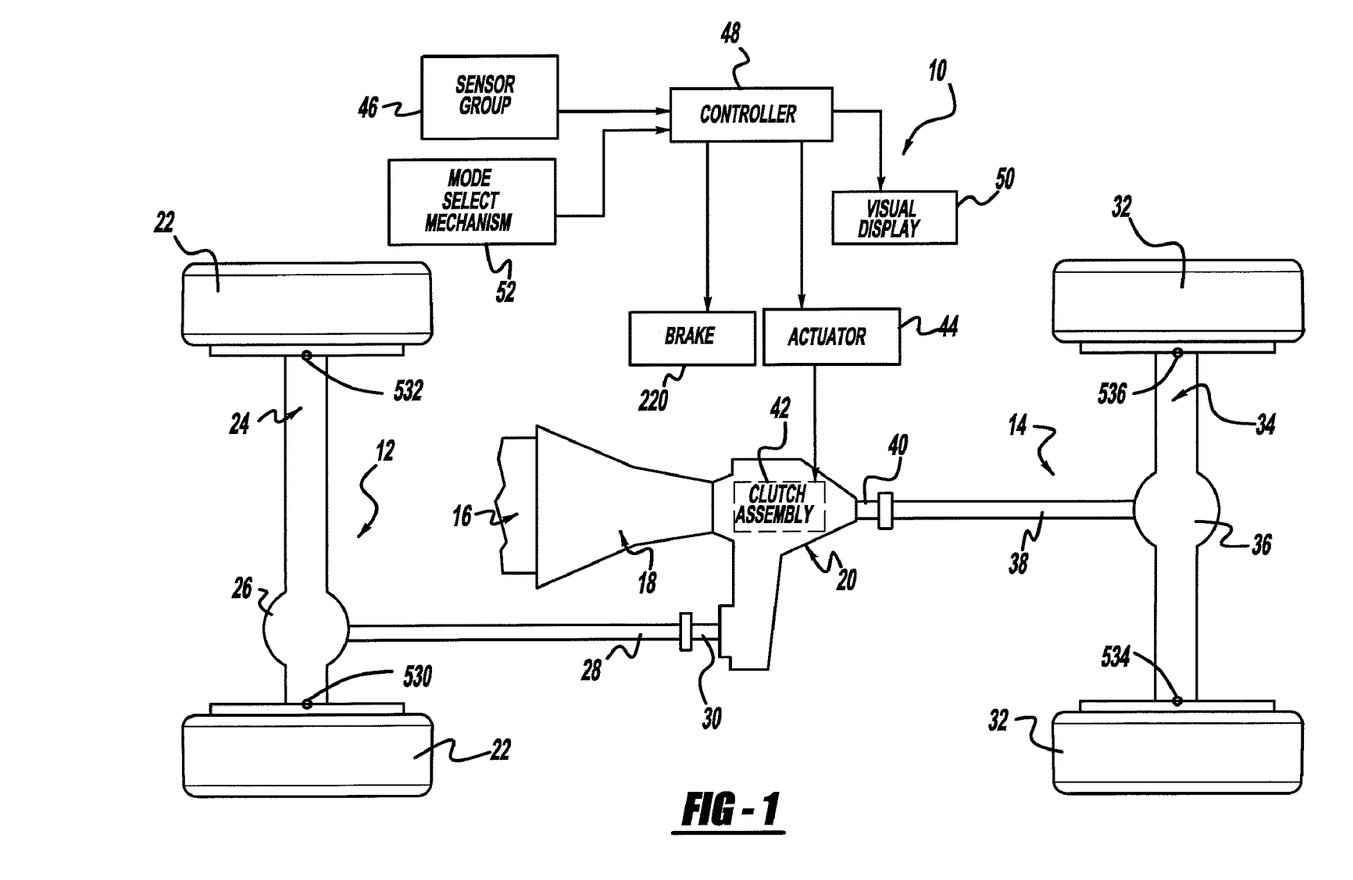
FIG. 1 is a schematic representation of a four-wheel drive motor vehicle equipped with the power transfer systems constructed in accordance with the teachings of the present disclosure.

Referring now to the drawings, a drivetrain for a four-wheel drive vehicle is schematically shown interactively associated with a power transfer system 10 of the present invention. The motor vehicle drivetrain includes a front driveline 12 and a rear driveline 14 both drivable from a source of power, such as an engine 16, through a transmission 18 which may be of either the manual or automatic type. In the particular embodiment shown, the drivetrain includes a power transfer assembly, hereinafter referred to as transfer case 20, that is operable for transmitting drive torque from engine 16 and transmission 18 to front driveline 12 and rear driveline 14. Front driveline 12 includes a pair of front wheels 22 connected at opposite ends of a front axle assembly 24 having a front differential 26 that is coupled to one end of a front drive shaft 28, the opposite end of which is coupled to a front output shaft 30 of transfer case 20. Similarly, rear driveline 14 includes a pair of rear wheels 32 connected at opposite ends of a rear axle assembly 34 having a rear differential 36 coupled to one end of a rear drive shaft 38, the opposite end of which is interconnected to a rear output shaft 40 of transfer case 20.

As will be detailed hereinafter with greater specificity, transfer case 20 is equipped with an electronically controlled mode clutch 42 that is operable to control the magnitude of speed differentiation and torque distribution between output shafts 30 and 40.

Power transfer system 10 further includes a power-operated actuator assembly 44 for actuating mode clutch 42, a sensor group 46 for sensing specific dynamic and operational characteristics of the motor vehicle and generating sensor input signals indicative thereof, and a controller 48 for generating control signals in response to the sensor input signals. Moreover, controller 48 is adapted to control the actuated condition of mode clutch 42 by sending control signals to actuator assembly 44. As is schematically shown, controller 48 is also operable for illuminating a visual display 50 located within the passenger compartment for providing the vehicle operator with a visual indication of the operational status of power transfer system 10.

Power transfer system 10 also includes a mode select mechanism 52 for permitting the vehicle operator to select one of the available drive modes. In particular, controller 48 controls actuator assembly 44 in response to a mode signal sent to controller 48 from mode select mechanism 52 that is indicative of the particular mode selected. When an "adaptive" four-wheel drive mode is selected, controller 48 operates to continuously monitor and automatically regulate the actuated condition of mode clutch 42 between its non-actuated and fully actuated limits for varying the magnitude of speed differentiation and torque transfer between output shafts 30 and 40. However, when the mode signal indicates that a "locked" four-wheel drive mode has been selected, mode clutch 42 is fully actuated, whereby non-differentiated power is delivered to output shafts 30 and 40. The locked four-wheel drive mode is provided for permitting improved traction when the motor vehicle is operated off-road or on severe road conditions.

Figure 2:
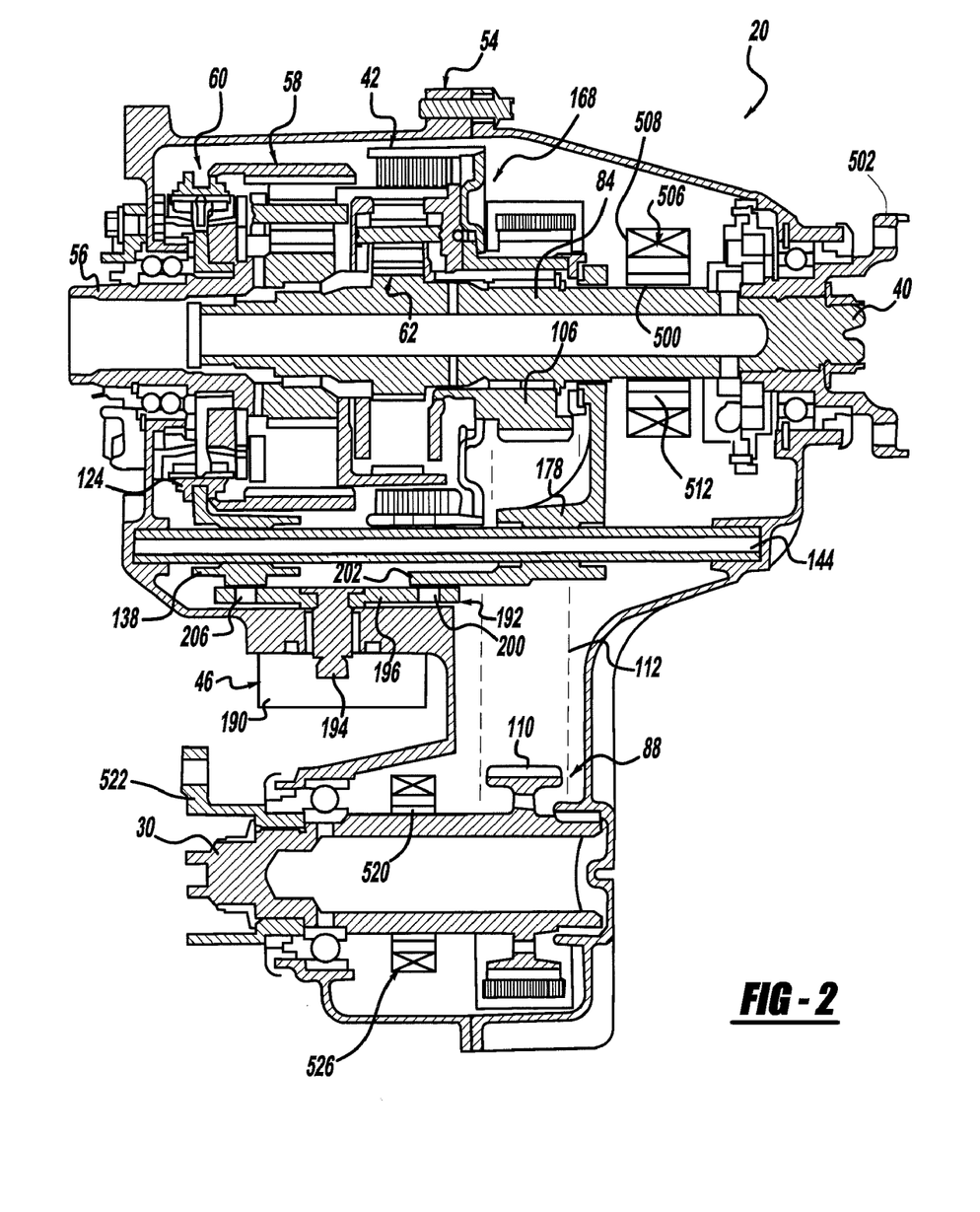
FIG. 2 is a sectional view of a portion of the power transfer system of FIG. 1 illustrating a two-speed full-time transfer case in more detail.
Figure 3:
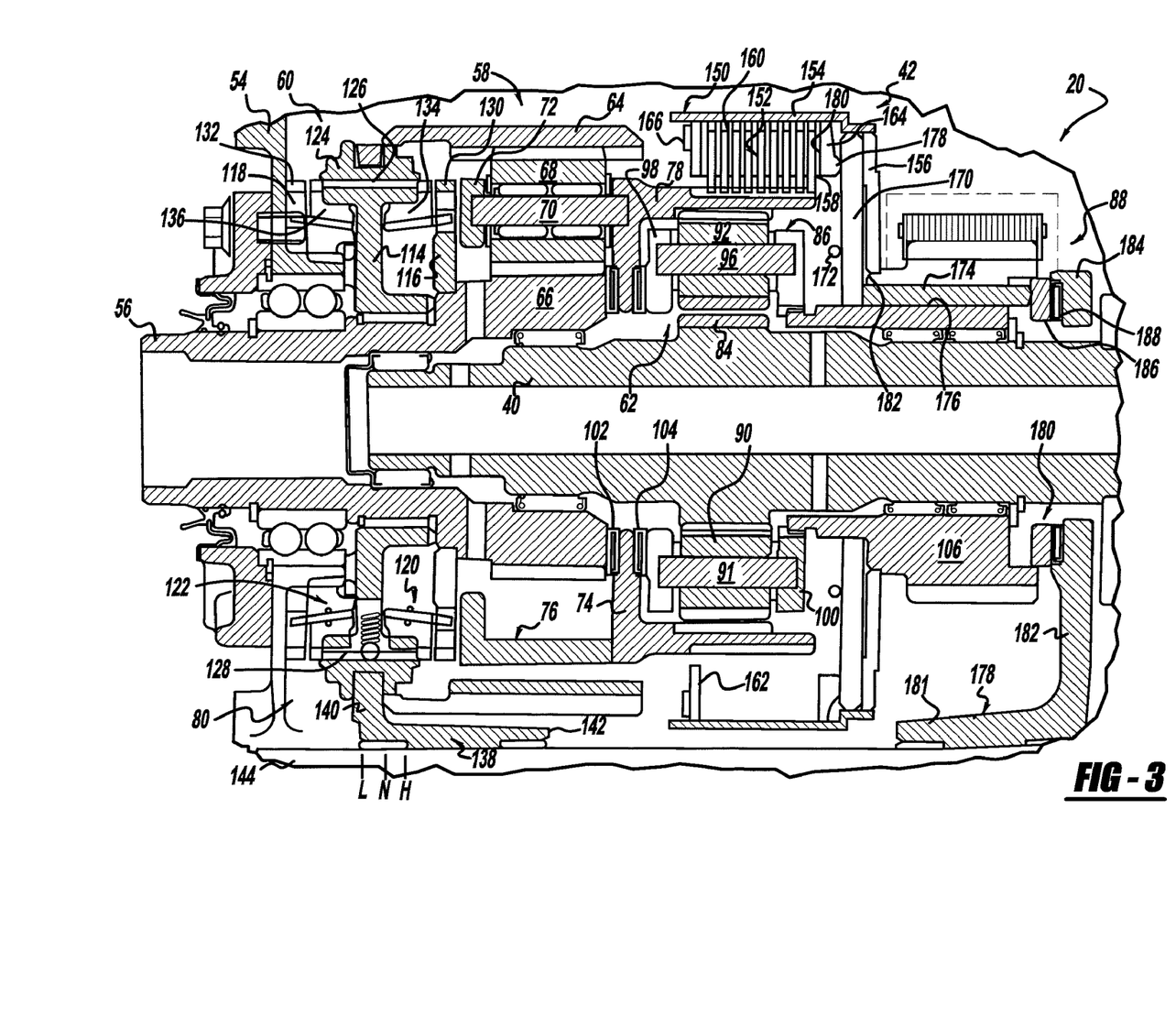
FIG. 3 is an enlarged partial sectional view taken from FIG. 2 showing the components in greater detail.

With particular reference now to FIGS. 2 and 3, transfer case 20 can include a housing assembly 54 and an input shaft 56 rotatably supported from housing assembly 54. Input shaft 56 is adapted to be coupled to an output shaft (not shown) of transmission 18 (FIG. 1) such that both are rotatably driven by engine 16 (FIG. 1) of the motor vehicle. The rear output shaft 40 can be rotatably supported between input shaft 56 and housing assembly 54 while the front output shaft 30 can be rotatably supported from housing assembly 54. In addition to clutch assembly 42, transfer case 20 can include a planetary gear assembly 58, a synchronized range shift mechanism 60, and an inter-axle differential 62. Planetary gear assembly 58 can include a first ring gear 64, a first sun gear 66 fixed for rotation with input shaft 56, and a set of first pinion gears 68 which can each be rotatably supported on a pinion shaft 70 and meshed with first sun gear 66 and first ring gear 64. Each pinion shaft 70 can extend between a front carrier ring 72 and a rear carrier ring 74 that can be interconnected to define a planet carrier 76. A second ring gear 78 can extend from rear carrier ring 74 of planet carrier 76 and can act as the input to inter-axle differential 62.

Planetary gear assembly 58 functions as a two-speed gear reduction unit which, in conjunction with a range clutch 80 associated with synchronized range shift mechanism 60, is operable for establishing first and second drive connections between input shaft 56 and second ring gear 78. The first drive connection is established by coupling the first ring gear 74 (via range clutch 80) for common rotation with input shaft 46. Thus, the first drive connection defines a high-range drive mode in which planet carrier 76 and second ring gear 78 are driven at a first (i.e., direct) speed ratio with respect to input shaft 56. Likewise, the second drive connection is established by range clutch 80 coupling first ring gear 64 to housing assembly 54. Thus, the second drive connection defines a low-range drive mode in which planet carrier 76 and second ring gear 78 are driven at a second (i.e., reduced) speed ratio relative to input shaft 56. A Neutral mode is established when range clutch 80 uncouples first ring gear 64 from both input shaft 56 and housing assembly 54. As will be detailed, synchronized range shift mechanism 60 is operable for permitting transfer case 20 to be shifted "on-the-move" between its high-range and low-range drive modes.

Inter-axle differential 62 functions to permit speed differentiation and distribute drive torque between front output shaft 30 and rear output shaft 40 so as to establish a differentiated or "full-time" four-wheel drive mode. As noted, second ring gear 78, when driven at either of the first and second speed ratios, acts as the input to inter-axle differential 62. Inter-axle differential 62 also includes a planetary gear set with outputs operably coupled to front output shaft 30 and rear output shaft 40.

The planetary gear set associated with interaxle differential 62 includes a second sun gear 84 fixed for rotation with rear output shaft 40, a pinion carrier 86 coupled via a transfer mechanism 88 for rotation with front output shaft 30, a set of second pinions 90 rotatably supported from pinion carrier 86 and meshed with second sun gear 84, and a set of third pinions 92 rotatably supported from pinion carrier 86 and meshed with second ring gear 78. In addition, pinions 90 and 92 are arranged in meshed pairs and are supported on corresponding pinion posts 94 and 96, which extend between a front carrier plate 98 and a rear carrier plate 100 that are interconnected to define pinion carrier 86. As seen, thrust bearings 102 and 104 locate rear carrier ring 74 for rotation relative to first sun gear 66 and front carrier plate 98. Transfer mechanism 88 includes a drive sprocket 106 rotatably supported on rear output shaft 40 and which has a tubular hub segment 108 splined to rear carrier plate 100 of pinion carrier 86.

In the particular example provided, a first sensor portion 500 is formed on rear output shaft 40 axially between second sun gear 84 and a coupling member 502 that can be employed to couple rear output shaft 40 to rear driveshaft 38 (FIG. 1). First sensor portion 500 is formed of a magnetoelastic material and can be bonded to the circumference of an underlying base material from which a remainder of rear output shaft 40 can be fabricated (i.e., to a shaft member). In this way, the base material may be selected to provide strength and durability to rear output shaft 40 independently of considerations magnetic properties of first sensor portion 500. In the example provided, the material that forms first sensor portion 500 is deposited onto the base material in a thermal spray process. Construction in this manner provides a robust bond that is capable of surviving relatively high mechanical stresses associated with the transmission of torque through rear output shaft 40. Alternatively, rear output shaft 40 could be formed entirely of a magnetoelastic material, or the magnetoelastic material may be applied to the base material in another suitable process, such as electroplating, or vapor deposition.

A first magnetoelastic torque sensor 506 is fixedly coupled to housing assembly 54 and mounted coaxially about first sensor portion 500 of rear output shaft 40. First magnetoelastic torque sensor 506 may be constructed as described in U.S. Pat. No. 6,330,833, the disclosure of which is hereby incorporated by reference as if fully set forth in detail herein. Briefly, first magnetoelastic torque sensor 506 includes a housing 508 and a sensor assembly 510. Housing 508 can have an annular body that defines a mounting aperture 512 through which rear output shaft 40 is received. Mounting aperture 512 is larger in diameter than first sensor portion 500 since first magnetoelastic torque sensor 506 is a non-contact type of sensor. Sensor assembly 510 can include a circular magnetometer that is housed in housing 508 and configured to measure the strength of a magnetic field emanating from first sensor portion 500.

Transfer mechanism 88 also includes a driven sprocket 110 fixed to front output shaft 30, and a power transfer device, such as chain 112, which interconnects driven sprocket 110 to drive sprocket 106. Front output shaft 30 includes a second sensor portion 520 that is axially located between driven sprocket 110 and a second coupling member 522 employed to couple front output shaft 30 to front driveshaft 28 (FIG. 1). Like first sensor portion 500 of rear output shaft 40, second sensor portion 520 is formed of a magnetoelastic material and can be bonded to the outer circumference of an underlying base material from which a remaining portion of front output shaft 30 can be formed. In the example provided, the material that forms second sensor portion 520 is deposited onto the base material in a thermal spray process, but it will be appreciated that any suitable process that provides a robust bond with the base material may be employed.

A second magnetoelastic torque sensor 526 is fixedly coupled to housing assembly 54 and mounted coaxially about second sensor portion 520 of front output shaft 38. Second magnetoelastic torque sensor 526 is generally similar to first magnetoelastic torque sensor 506 and as such, need not be discussed in further detail herein.

Synchronized range shift mechanism 60 is shown to include a clutch hub 114 rotatably supported on input shaft 56, a first clutch plate 116 fixed to input shaft 56, a second clutch plate 118 fixed to housing assembly 54, a first synchronizer assembly 120 disposed between clutch hub 114 and first clutch plate 116, and a second synchronizer assembly 122 disposed between clutch hub 114 and second clutch plate 118. Range clutch 80 includes a range sleeve 124 having a set of internal clutch teeth 126 maintained in constant mesh with external teeth 128 formed on clutch hub 114. Furthermore, range sleeve 124 is fixed for rotation with first ring gear 74. With range sleeve 124 in a neutral position, as denoted by position line "N", its clutch teeth 126 are disengaged from meshed engagement with clutch teeth 130 on first clutch plate 116 and clutch teeth 132 on second clutch plate 118. First synchronizer assembly 120 is operable for causing speed synchronization between input shaft 56 and first ring gear 64 in response to movement of range sleeve 124 from its N position toward a high-range position, as denoted by position line "H". Once the speed synchronization process is completed, clutch teeth 126 on range sleeve 124 are permitted to move through the teeth of a blocker ring 134 and into meshed engagement with clutch teeth 130 on first clutch plate 116. Accordingly, with range sleeve 124 positioned in its H position, first ring gear 64 is coupled to first clutch plate 116, whereby second ring gear 78 of inter-axle differential 62 is coupled to rotate at the same speed as input shaft 56 for establishing the first drive connection therebetween. Thus, when the first drive connection is established, transfer case 20 is operating in a four-wheel high-range drive mode.

Second synchronizer assembly 122 is operable to cause speed synchronization between first ring gear 64 and housing assembly 54 in response to movement of range sleeve 124 from its N position toward a low-range position, as denoted by position line "L". Once speed synchronization is complete, clutch teeth 126 on range sleeve 124 move through teeth on a blocker ring 136 and into meshed engagement with clutch teeth 132 on second clutch plate 118. With range sleeve 124 positioned in its L position, first ring gear 64 is braked against rotation such that first sun gear 66 drives first pinion gears 68 about stationary first ring gear 64, whereby planet carrier 76 and second ring gear 78 are driven at the reduced speed ratio relative to input shaft 56 for establishing the second drive connection. Thus, when the second drive connection is established, transfer case 20 is operating in a four-wheel low-range drive mode. When range sleeve 124 is in its N position, no drive torque is transferred to second ring gear 78, thereby establishing the Neutral mode.

To provide means for moving range sleeve 124 between its three distinct positions, synchronized range shift mechanism 60 further includes a range fork 138 having a projection 140 that is retained in a groove formed in range sleeve 124. Range fork 138 also includes a tubular segment 142 that is journalled for sliding axial movement on a shift rail 144, the opposite ends of which are supported in sockets formed in housing assembly 54. As will be described, transfer case 20 includes means for causing axial movement of range fork 138 and, in turn, range sleeve 124 between the three above-noted positions in response to controlled actuation of actuator assembly 44.

Mode clutch 42 is arranged for controlling speed differentiation and torque biasing between second ring gear 78 and pinion carrier 86 of inter-axle differential 62. Mode clutch 42 is a multi-plate friction clutch assembly which includes an outer drum 150 fixed for rotation with drive sprocket 106 and a clutch pack 152 operably installed between outer drum 150 and second ring gear 78. In particular, outer drum 150 includes a cylindrical drum housing 154 fixed (i.e., welded) to a housing plate 156 which, in turn, is fixed (i.e., welded) to drive sprocket 106. Clutch pack 152 includes a set of inner clutch plates 158 splined to second ring gear 78 that are alternately interleaved with a set of outer clutch plates 160 splined to drum housing 154. Clutch pack 152 is shown to be located between a reaction plate 162 splined to drum housing 154 and a pressure plate 164 journalled in drum housing 154. A snap ring 166 axially restrains and locates reaction plate 162 on drum housing 154. Movement of pressure plate 164 functions to vary the frictional compressive force exerted on clutch pack 152 for regulating speed differentiation and biasing the torque distribution between rear output shaft 40 and front output shaft 30.

Mode clutch 42 is also shown to include a clutch actuation mechanism 168 for moving pressure plate 164 under the control of actuator assembly 46. Clutch actuation mechanism 168 includes a set of lever arms 170 disposed adjacent to housing plate 156, a return spring 172 engaging lever arms 170, and a set of thrust pins 174 retained in through bores 176 formed in drive sprocket 106. Lever arms 170 are equidistant and are retained for pivotal movement in radial channels formed in drum plate 156. Through bores 176 are equally spaced in a circumferential arrangement and are aligned with the radial channels in drum plate 156. In the particular embodiment illustrated, clutch actuation mechanism 168 includes a set of six lever arms 170 and thrust pins 174. As seen, an annular rim projection 178 on pressure plate 164 engages an upper front face 180 of each lever arm 170 while a first end of each thrust pin 174 engages a lower rear face 182 of a corresponding lever arm 170. Thus, axially sliding movement of thrust pins 174 in a first (i.e., forward) direction from a fully retracted position to a fully extended position causes lever arms 170 to pivot, in opposition to the biasing of return spring 172, from a first position to a second position. With lever arms 170 in the first position, pressure plate 164 exerts a predetermined minimum clutch engagement force on clutch pack 152. In contrast, when lever arms 170 are in the second position, pressure plate 164 exerts a predetermined maximum clutch engagement force on clutch pack 152.

To provide means for moving thrust pins 174 between the fully retracted and extended positions, clutch actuation mechanism 168 further includes a mode fork 178 and a thrust bearing assembly 180. Mode fork 178 has a tubular segment 181 journalled on shift rail 144 and an arm segment 182 with an end portion 184 at least partially surrounding rear output shaft 40. Thrust bearing assembly 180 includes a thrust ring 186 and a bearing assembly 188 disposed between thrust ring 186 and end portion 184 of arm segment 182 on mode fork 178. As seen, the second end of each thrust pin 174 engages thrust ring 186. Thus, axial movement of mode fork 178 on shift rail 144 causes corresponding axial movement of thrust pins 174, which, as noted, functions to control actuation of clutch assembly 42.

Preferably, actuator assembly 46 includes a rotary actuator, such as an electric gear motor 190, which is operable for generating an output torque, the value of which varies as a function of the magnitude of the electrical control signal applied thereto by controller 48. To provide means for selectively controlling the magnitude of the clutch engagement force exerted on clutch pack 152, actuator assembly 46 further includes a drive mechanism 192. Drive mechanism 192 is interconnected to a rotary output member 194 of gear motor 190 for changing its output torque into an axially directed force that is used for controlling axial movement of range sleeve 124 and mode fork 178. According to a preferred construction, drive mechanism 192 includes a sector plate 196 that is rotatably driven through a range of angular motion by output member 194 of gear motor 190. As will be detailed, sector plate 196 is operable for causing coordinated axial movement of range sleeve 124 and mode fork 178 for establishing several different drive modes.

To generate axial movement of mode fork 178, sector plate 196 includes a mode slot 198 within which a mode pin 200 is retained. Mode pin 200 is fixed to a flange section 202 of mode fork 178. The contour of mode slot 198 is configured to cause the desired direction and amount of axial movement of mode fork 178 in response to rotation of sector plate 196 for generating the desired clutch engagement force. To control axial movement of range sleeve 124, sector plate 196 also has a range slot 204 within which a range pin 206 extends. Range pin 206 is fixed to tubular segment 142 of range fork 138. As such, the contour of range slot 204 is configured to cause controlled axial movement of range sleeve 124 in response to controlled rotation of sector plate 196.

Figure 4:
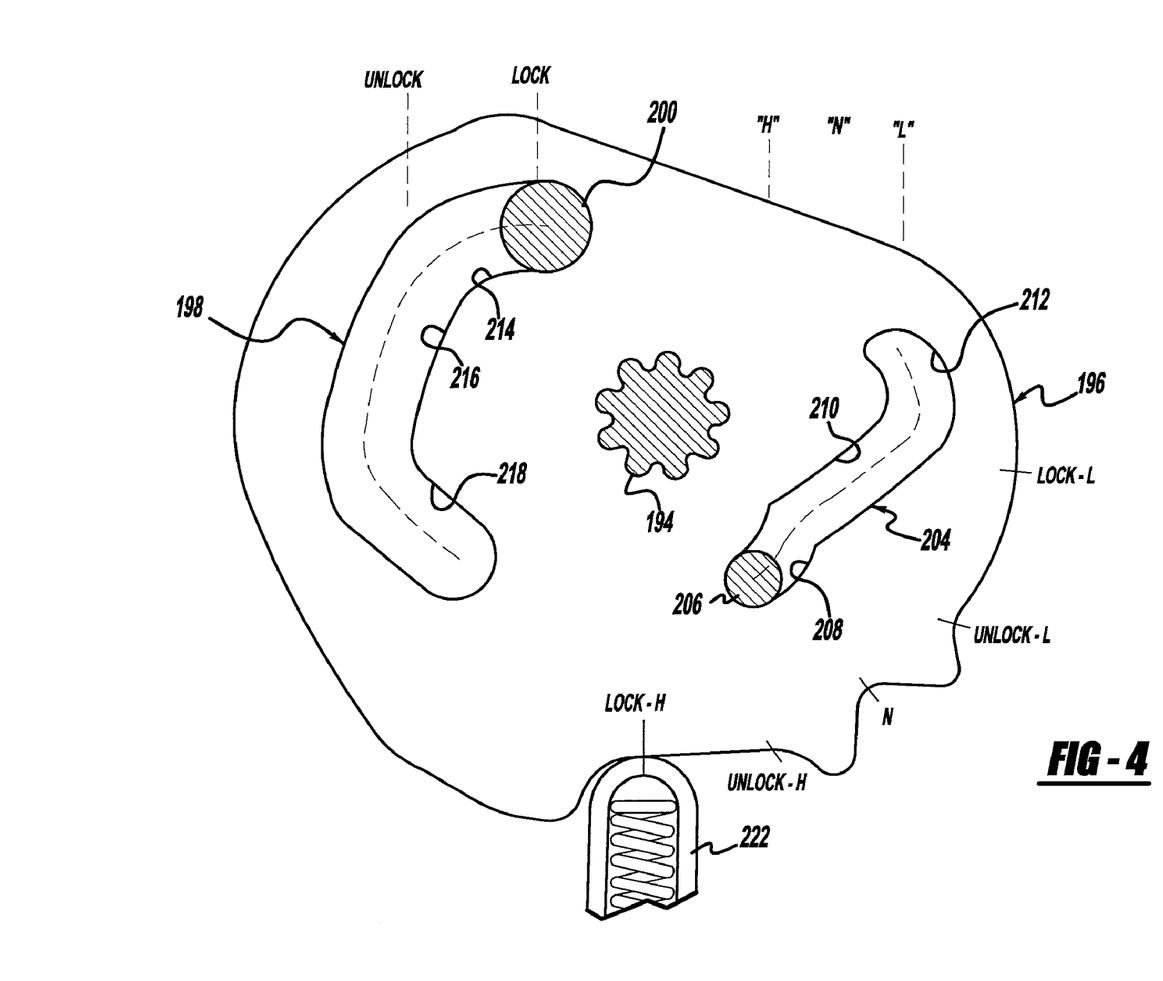
FIG. 4 is a side view of a sector plate associated with the drive mechanism for controlling coordinated actuation of the synchronized range shift mechanism and the clutch assembly.

In FIG. 4, sector plate 196 may be rotated about an axis 208 to any one of five distinct sector positions, as labeled "LOCK-H", "UNLOCK-H", "N", "UNLOCK-L", and "LOCK-L". As will be detailed, transfer case 20 is operable for establishing at least five distinct operative modes, namely, a locked four-wheel high-range drive mode, a full-time four-wheel high-range drive mode, a Neutral non-driven mode, a full-time four-wheel low-range drive mode, and a locked four-wheel low-range drive mode. The particular operational mode selected is established by the position of mode pin 200 in mode slot 198 and the position of range pin 206 in range slot 204. In operation, the vehicle operator selects a desired drive mode via actuation of mode select mechanism 52 (FIG. 1) which, in turn, sends a mode signal to controller 48 (FIG. 1) that is indicative of the selection. Thereafter, controller 48 (FIG. 1) generates an electric control signal that is applied to gear motor 190 (FIG. 2) for controlling the rotated position of sector plate 196. More particularly, upon selection of the locked four-wheel high-range drive mode, the Neutral mode or the locked four-wheel low-range drive mode, sector plate 196 is controllably rotated to each mode's predefined sector position, namely LOCK-H, N, or LOCK-L. However, when either of the full-time four-wheel high-range or low-range drive modes is selected, power transfer system 10 (FIG. 1) is operable for modulating the clutch engagement force applied to clutch pack 152 of mode clutch 42 as a function of the various sensor input signals. Mode select mechanism 52 (FIG. 1) can take the form of any mode selector device which is under the control of the vehicle operator for generating a mode signal indicative of the specific mode selected. In one form, the mode selector device may be an array of dash-mounted push button switches. Alternatively, the mode selector device may be a manually operable shift lever sequentially movable between a plurality positions corresponding to the available operational modes which, in conjunction with a suitable electrical switch arrangement, generates a mode signal indicating the mode selected. In any form, mode select mechanism 52 (FIG. 1) offers the vehicle operator the option of deliberately choosing between the various operative drive modes.

With additional reference to FIG. 3, the contour of range slot 204 is defined by first, second and third cam pathways 208, 210 and 212, respectively, which correspond to fourth, fifth and sixth cam pathways 214, 216 and 218, respectively, associated with mode slot 198. In the LOCK-H sector position shown, mode pin 200 is positioned within mode slot 198 in proximity to the terminal end of fourth cam pathway 214 for locating mode fork 178 in a locked position, as denoted by position line "LOCK". With mode fork 178 in this position, thrust pins 174 have been moved to their fully extended position and lever arms 170 have been pivoted to their second position. As such, the maximum clutch engagement force is exerted on clutch pack 152 and mode clutch 42 is considered to be operating in a fully actuated (i.e., locked-up) condition. In addition, range pin 206 is shown positioned within range slot 204 in proximity to the terminal end of first cam pathway 208 for positioning range sleeve 124 in its H position. Accordingly, when mode select mechanism 52 signals that the vehicle operator has selected the locked four-wheel high-range drive mode, controller 48 sends a control signal to gear motor 190 to rotate sector plate 196 to the LOCK-H sector position.

With reference to FIGS. 1, 3 and 4, power transfer system 10 also includes a brake 220 that provides a means for holding sector plate 196 in its LOCK-H sector position. Brake 220 can be an electrically controlled spring-applied device that can be operable in a "power-off" condition for braking rotation of gear motor output member 194. During controlled rotation of sector plate 196, an electrical signal from controller 48 maintains brake 220 in its "power-on" condition. However, once sector plate 196 has been rotated to its LOCK-H position, power to brake 220 is interrupted to shift it into its power-off condition, thereby locking sector plate 196 against rotation.

If mode select mechanism 52 thereafter signals selection of the full-time four-wheel high-range drive mode, gear motor 190 is actuated for rotating sector plate 196 from the LOCK-H sector position toward its UNLOCK-H sector position, whereby the contour of fourth cam pathway 214 in mode slot 198 causes axial displacement of mode pin 200 which, in turn, causes movement of mode fork 178 from the LOCK position toward an unlocked position, as denoted by position line "UNLOCK". Such movement of mode fork 178 permits return spring 172 to urge lever arms 170 toward the first position, which, in turn, moves thrust pins 174 toward the fully retracted position, thereby causing a proportional decrease in the clutch engagement force exerted on clutch pack 152. During such rotation of sector plate 196, the contour of first cam pathway 208 maintains range sleeve 124 in its H position. Moreover, once mode fork 178 is in its UNLOCK position, lever arms 170 are located in the first position and mode clutch 42 is considered to be in a non-actuated condition, thereby permitting unrestricted speed differentiation between front and rear drivelines 12 and 14, respectively.

When transfer case 20 is operating in its full-time four-wheel high-range drive mode, electronically controlled mode clutch 42 is active for providing adaptive control of speed differentiation and torque biasing across inter-axle differential 62. Specifically, the actuated state of gear motor 190 is continuously monitored and modulated in accordance with specific predefined relationships established based on the current value of the sensor input signals. Thus, in the full-time four-wheel high-range drive mode, power transfer system 10 acts as an adaptive system for continuously monitoring and automatically regulating the actuated condition of clutch assembly 42 in a manner that is independent of any deliberate action by the vehicle operator. The magnitude of clutch actuation is defined between the limits of bi-directional rotation of sector plate 196 between its LOCK-H and UNLOCK-H sector positions.

Sensor group 46 includes first and second magnetoelastic torque sensors 506 and 526 and, if desired, one or more speed sensors that can be associated with each of front and rear drivelines 12 and 14. In the particular example provided, first and second wheel speed sensors 530 and 532, respectively, are employed to sense the rotational speeds of the front wheels 22, while third and fourth wheel speed sensors 534 and 536, respectively, are employed to sense the rotational speeds of the rear wheels 32. Torque biasing across inter-axle differential 62 may be controlled based on signals generated by first and second magnetoelastic torque sensors 506 and 526. For example, the mode clutch 42 may be controlled to split torque across the inter-axle differential 62 according to a predetermined ratio (e.g., 40% to front driveline 12 and 60% to rear driveline 14). Since first and second magnetoelastic torque sensors 506 and 526 are located on opposite end of inter-axle differential 62, the magnitude of the torque split may be precisely quantified and monitored. In situations where traction is being lost across a given axle assembly (e.g., the rear axle assembly 34) such that the wheels associated with that axle assembly (e.g., the rear wheels 32) have started to slip, the magnitude of the torque that is transmitted to that axle assembly will experience a sudden decrease that is readily detectable via an associated magnetoelastic torque sensor (e.g., the first magnetoelastic torque sensor 506). Controller 48 can be configured to control the mode clutch 42 to change the torque split in such situations so as to divert power away from the axle assembly with the slipping wheels.

Controller 48 can identify a point at which wheel slip has been eliminated or controlled based upon stabilization of the signal from the magnetoelastic torque sensor and/or a comparison between the signals of two or more of the wheel speed sensors 530-536. Controller 48 can be configured to control mode clutch 42 to change the torque split so as to direct power to the axle assembly with the formerly slipping wheels so that the torque split may return to the predetermined ratio. It will be appreciated that the rate with which power is directed to the axle assembly with the formerly slipping wheels may be a rate that can be predetermined or could be selected or determined on the basis of various vehicle dynamics (e.g., vehicle speed, steering angle). As such, it will be appreciated that the first and second magnetoelastic torque sensors 506 and 526 may be employed to assess traction of front and rear drivelines 12 and 14 while power is being directed to the axle assembly with the formerly slipping wheels so that this process may be halted if the axle assembly with the formerly slipping wheels loses traction.

Power transfer system 10 is also operable to permit transfer case 20 to be shifted out of either of the locked and full-time four-wheel high-range drive modes and into the Neutral mode. Specifically, upon mode select mechanism 52 signaling selection of the Neutral mode, gear motor 190 is actuated for causing sector plate 196 to rotate to its N sector position, whereby mode pin 200 is positioned within fifth cam pathway 216 of mode slot 198 and range pin 206 is positioned within second cam pathway 210 of range slot 204. The contour of fifth cam pathway 216 is designed to retain mode fork 178 in its UNLOCK position, whereby clutch assembly 42 is maintained in the non-actuated condition. However, range pin 206 is axially displaced due to the contour of second cam pathway 210 for shifting range sleeve 124 from its H position into its N position.

Thereafter, if the full-time four-wheel low-range drive mode is selected, sector plate 196 is initially rotated to its UNLOCK-L sector position. Upon such movement, mode pin 200 is guided in fifth cam pathway 216 of mode slot 198 for maintaining mode fork 178 in its UNLOCK position while range pin 206 is guided within second cam pathway 210 to axial shift range sleeve 124 into its L position. Thus, during "range" shifting of range sleeve 124 between its three distinct positions, sector plate 196 is configured to maintain mode clutch 42 in its non-actuated condition. Preferably, automatic clutch control in the full-time four-wheel low-range drive mode is similar to that disclosed above for operation in the full-time four-wheel high-range drive mode, wherein gear motor 190 is actuated in accordance with specific predefined relationships established based on the current value of the sensor input signals for rotating sector plate 196 to a position between the limit of its UNLOCK-L and LOCK-L sector positions. As such, mode clutch 42 is non-actuated when sector plate 196 is in its UNLOCK-L sector position and is fully actuated when sector plate 196 is in its LOCK-L sector position. Accordingly, the modulation range is established between the limits of bi-directional rotation of sector plate 196 between its UNLOCK-L and LOCK-L sector positions for causing movement of mode pin 200 within sixth cam pathway 218 of mode slot 198 for moving mode fork 178 between its UNLOCK and LOCK positions while range sleeve 124 is maintained in its L position due to the contour of third cam pathway 212.

Finally, transfer case 20 can be shifted into its locked four-wheel low-range drive mode by causing sector plate 196 to be rotated to its LOCK-L sector position. In this position, mode pin 200 is positioned in sixth cam pathway 218 in proximity to its terminal end for locating mode fork 178 in its LOCK position while range pin 206 is located in proximity to the terminal end of third cam pathway 212 for positioning range sleeve 124 in its L position. Again, brake 220 is thereafter shifted into its power-off condition for mechanically locking sector plate 196 in its LOCK-L sector position. A spring-biased poppet assembly 222 is provided for generating a signal supplied to controller 48 that is indicative of the rotated position of sector plate 196. Those skilled in the art will understand that gear motor 190 is operable to rotate sector plate 196 in both directions to facilitate shifting between any available modes during motive operation of the motor vehicle. Moreover, while power transfer system 10 is disclosed to provide five different operative modes, in some applications it may be decided to limit the selection of available drive modes. For example, it is contemplated that mode select mechanism 52 could be easily adapted to permit selection of three drive modes, namely, the full-time four-wheel high-range drive mode, the Neutral mode, and the locked four-wheel low-range drive mode. However, those skilled in the art will recognize that the above-described structure for sector plate 196 would still be applicable.

It will be appreciated that the ability to accurately monitor (and control) the distribution of torque between drivelines can improve the accuracy and consistency of the torque delivered through a torque biasing system. By way of comparison, presently employed methodologies typically rely on the prediction of torque through measurement of various vehicle parameters used to actuate the torque transfer device. An example of such predictive methodologies is disclosed in U.S. Pat. No. 6,450,921, the disclosure of which is hereby incorporated by reference as if fully set forth in detail herein.

The predictive methodology is typically attended by error that results between differences in theoretical torque transmission and actual torque transmission. These differences can be influenced by slip speed, throttle angle, temperature, component wear and the bedding-in of components. Accordingly, the transfer case of the present disclosure permits direct control of driveline torque under conditions where sufficient torque is provided by the prime mover; accurate reporting of driveline torque to the vehicle communications system (e.g., controller 48 in FIG. 1) for the use of other on-board devices, such as dynamic stability control systems; and continuous or periodic calibration of core control algorithms and strategies to improve response time, accuracy and consistency of the torque biasing system. It will be appreciated that calibration of the core control algorithms and/or strategies can be performed on an immediate basis (i.e., re-calibrate based on the "new" data) or through a filtering method whereby the "new" data is employed at a controlled rate to re-calibrate. It will also be appreciated that the filtering could include low-pass filtering, running average filtering, weighted filtering, etc.

For example, tuning of a controls model can be accomplished through a comparison between the known inputs and control model inputs. When a known condition is determined to be present, the predicted control model torque can be compared to the actual torque values measured by the torque sensors and offset adjustments can be made as necessary.

In appropriate situations, the actual torque values may be employed by controller 48 to override a "conventional" control methodology (i.e., a control methodology that predicts torque). In such situations, controller 48 may employ any appropriate type of real-time feedback control, including PID, LMA, and/or GPC feedback control. Additionally, the feedback control may provide for a selection between various fixed model variations or state-space model selection.

While front output shaft 30 and the rear output shaft 40 have been described as including first and second sensor portions 500 and 520, respectively, that are each bonded to an underlying base material, it will be appreciated that the teachings of the present disclosure may be more broadly construed. In this regard, one or more of front and rear output shafts 30 and 40 may be formed as an assembly having a discrete magnetoelastic member that can be employed to transmit torque between an output shaft and another power-transmitting element in the transfer case.

Figure 5:
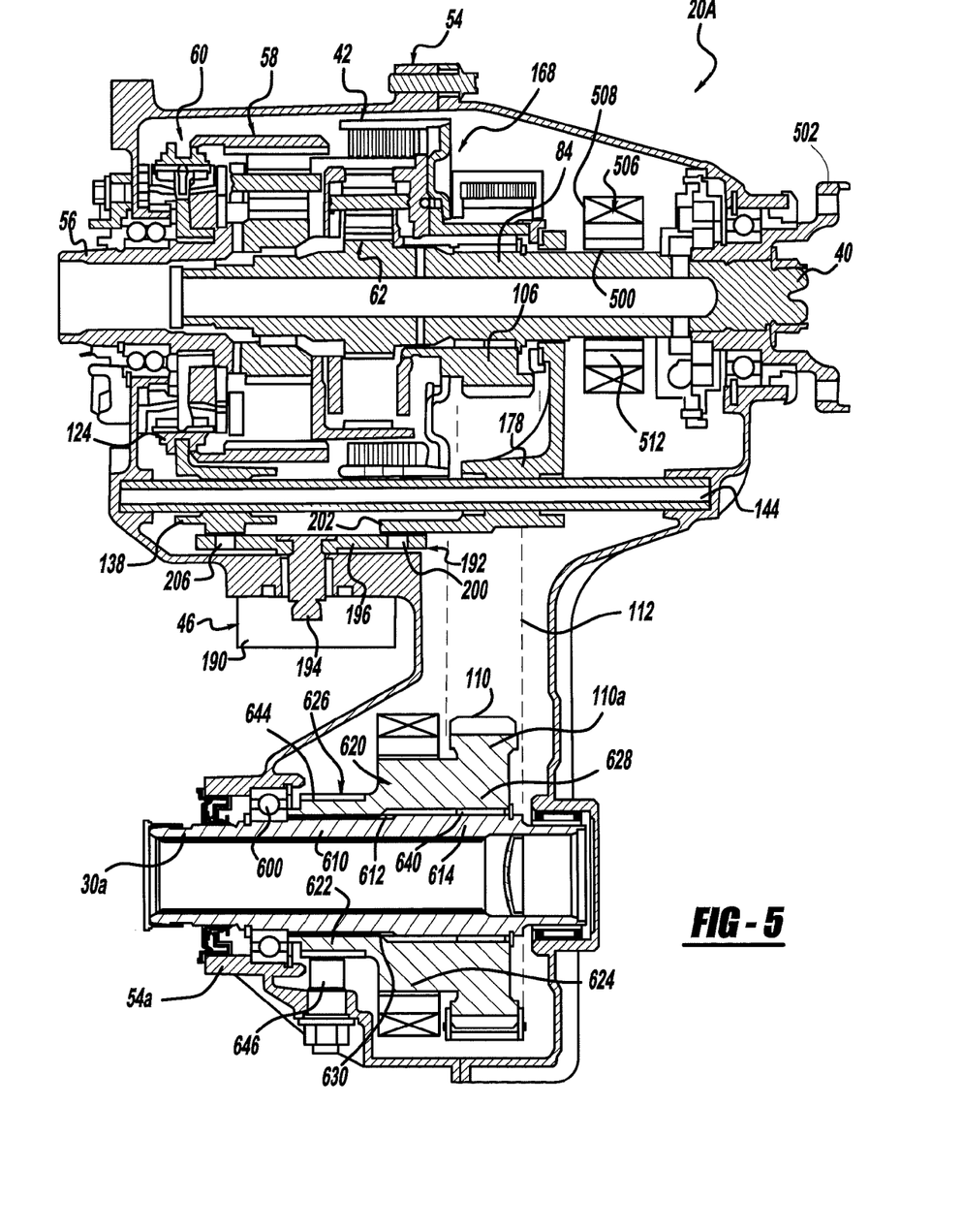
FIG. 5 is a sectional view similar to that of FIG. 2 but illustrating another transfer case constructed in accordance with the teachings of the present disclosure.

With reference to FIG. 5, a transfer case constructed in accordance with the teachings of the present disclosure is generally indicated by reference numeral 20a. Except as described herein, transfer case 20a can be configured in a manner that is identical to transfer case 20 described above in conjunction with FIGS. 1-4. In the embodiment illustrated, front output shaft 30a is supported for rotation within housing assembly 54a via a pair of bearings 600 and 602. Front output shaft 30a includes a coupling portion 610, which can have a plurality of circumferentially spaced apart axially extending spline members 612 and a support portion 614.

An intermediate shaft 620 can be disposed concentrically about front output shaft 30a. Intermediate shaft 620 can include a mating coupling portion 622, a first sensor portion 624, a second sensor portion 626 and a mounting portion 628. Mating coupling portion 622 couples intermediate shaft 620 to coupling portion 610 of front output shaft 30a. In the example provided, mating coupling portion 622 includes a plurality of mating spline members 630 that engage spline members 612 of coupling portion 610 to thereby rotationally fix intermediate shaft 620 to front output shaft 30a. A bushing 640 can be disposed between front output shaft 30a and mounting portion 628 to thereby support mounting portion 628 in a radial direction. Driven sprocket 110a of the transfer mechanism 88a is mounted or integrally formed with mounting portion 628. First sensor portion 624 is disposed axially between driven sprocket 110a and mating coupling portion 622 and can be formed in part or in whole by a magnetoelastic material. Preferably, the magnetoelastic material is bonded to the outer circumference of a base underlying material that forms at least a portion of the remainder of intermediate shaft 620. The magnetoelastic material may be applied via a thermal spray process or any other process that provides a robust bond to the base underlying material. Second sensor portion 626 can include a plurality of circumferentially spaced apart teeth 644 that cooperates with a conventional Hall-effect sensor 646 mounted to housing assembly 54a to permit the rotational speed of the intermediate shaft 620 (and therefore front output shaft 30a) to be precisely determined (e.g., via a controller).

While transfer cases 20 and 20a of FIGS. 2 and 5, respectively, have been described and illustrated as being full-time transfer cases, those of ordinary skill in the art will appreciate that the disclosure, in its broadest aspects, has other applicability, including on-demand type transfer cases. In this regard, it will be appreciated that an on-demand type transfer case may be provided through the elimination of inter-axle differential 62 in FIGS. 2 through 4. In this regard, rear carrier ring 74 can be configured to meshingly engage a splined segment (e.g., second sun gear 84) to thereby directly drive the rear output shaft 40, which is illustrated and described in commonly-owned U.S. Pat. No. 6,554,731, the disclosure of which is hereby incorporated by reference as if fully set forth in detail herein. As such, drive torque can be transferred from planetary gear assembly 58 to rear output shaft 40 to define the high-range, Neutral and low-range modes while mode clutch 42 is arranged to transfer drive torque from rear output shaft 40 to front output shaft 30 for establishing the available two-wheel and four-wheel drive modes.

When the part-time four-wheel high-range drive mode is selected, gear motor 190 rotates sector plate 196 to its LOCK-H sector position such that mode clutch 42 is fully actuated and range sleeve 124 is located in its H position. Thereafter, brake 220 is shifted into its power-off condition to hold sector plate 196 in its LOCK-H position. As such, mode clutch 42 acts to couple front output shaft 30 for common rotation with rear output shaft 40.

When the two-wheel high-range drive mode is selected, gear motor 190 rotates sector plate 196 to its UNLOCK-H sector position such that mode clutch 42 is released with range sleeve 124 located in its H position. As such, all drive torque is transmitted to rear output shaft 40. Typically, a wheel or axle disconnect system (not shown) under the control of controller 48 (FIG. 1) would be actuated to disconnect front drive shaft 28 from driven connection with front wheels 22 (FIG. 1) when the two-wheel drive mode is selected.

When the on-demand four-wheel high-range drive mode is selected, electronically controlled mode clutch 42 is active for providing adaptive control of the torque transfer from rear output shaft 40 to front output shaft 30. The actuated state of gearmotor 190 is continuously monitored and modulated according to predefined relationships established based on the sensor input signals for automatically regulating the actuated state of mode clutch 42. Thus, the magnitude of clutch actuation is defined between the limits of bi-directional rotation of sector plate 196 between its UNLOCK-H and LOCK-H sector positions. Furthermore, when the Neutral mode is selected, sector plate 196 is rotated to its N sector position and no drive torque is delivered to either output shaft.

When the on-demand four-wheel low-range drive mode is selected, gear motor 190 initially rotates sector plate 196 to its UNLOCK-L sector position. Thereafter, electronically controlled mode clutch 42 is active for providing adaptive control of the torque transfer from rear output shaft 40 to front output shaft 30. Such adaptive control is provided by controlling the position of sector plate 196 between its UNLOCK-L and LOCK-L sector positions in accordance with specific predefined relationships established based on the current values of the sensor input signals sent to controller 48. Finally, transfer case can be shifted into its part-time four-wheel low-range drive mode by rotating sector plate 196 to its LOCK-L sector position to fully-actuated mode clutch 42 and locate range sleeve 124 in its L position. Again, brake 220 will be shifted into its power-off condition for locking sector plate 196 in its LOCK-L sector position. While six different modes were disclosed for transfer case, it is contemplated that various combinations of these drive modes could be made available based on a particular vehicular application.

Figure 6:
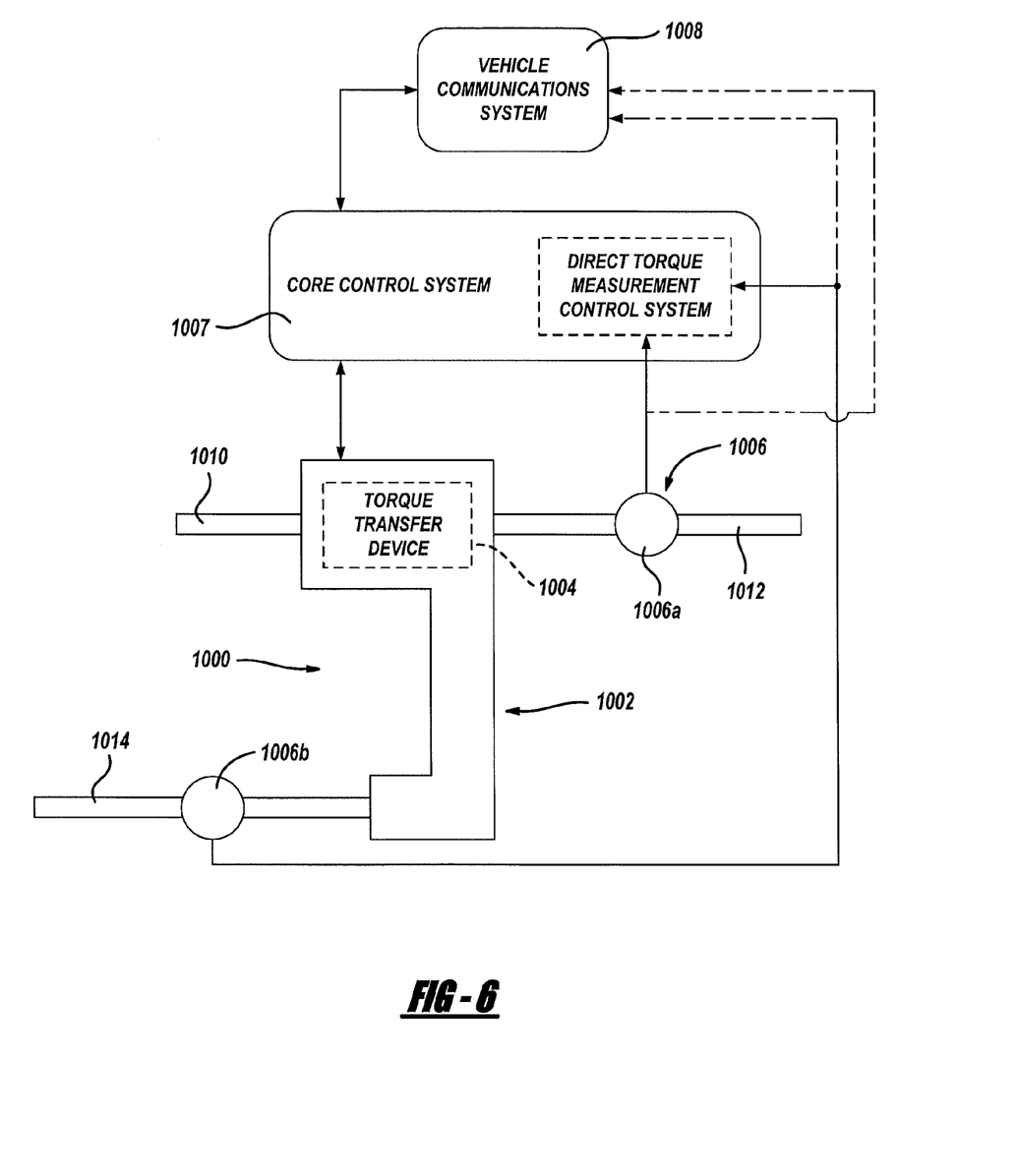
FIGS. 6 and 7 are schematic representations of a driveline for a four-wheel drive motor vehicle constructed in accordance with the teachings of the present disclosure.

With reference to FIG. 6, a vehicle is schematically illustrated to include a driveline 1000 having a power transfer assembly 1002 equipped with an electronically-controlled torque transfer device 1004, at least one torque sensor 1006, a device controller 1007, and a vehicle controller 1008. Power transfer assembly 1002 and electronically-controlled torque transfer device 1004 can be any type of torque transfer device, including a transmission, an electronically-locking differential, an in-line coupling such as a clutch, or a PTO/PTU. However, in the particular example disclosed, a transfer case is shown having an input member 1010, a first output member 1012, a second output member 1014, and electronically-controlled device 1004. Preferably, device 1004 is a torque coupling having a multi-plate friction clutch and a power-operated actuator for controlling variable engagement of the clutch. As is understood, friction clutch is arranged to transfer drive torque from one of input member 1010 and first output member 1012 to second output member 1014. Also in the example provided, a first torque sensor 1006a is associated with first output member 1012 and a second torque sensor 1006b is associated with second output member 1014. First and second torque sensors 1004a and 1004b generate sensor signals in response to the magnitude of sensed torque that is transmitted through first and second output members 1012 and 1014, respectively.

Device controller 1007 is in communication with electronically-controlled torque transfer device 1004 (i.e., to electronically-controlled clutch actuator), first and second torque sensors 1004a and 1004b, and vehicle controller 1008 (e.g., via a conventional communications/data bus). Optionally, first and second torque sensors 1004a and 1004b can be in communication with vehicle controller 1008, but it will be appreciated that device controller 1007 can transmit torque information (e.g., the sensor signals or signals that are based on the sensor signals) to vehicle controller 1008.

It will be appreciated that the control methodology employed by device controller 1007 and/or vehicle controller 1008 can be accomplished by comparing the known inputs with control model inputs. When a known condition is determined to be present, the predicted control model torque can be compared to the actual torque values measured by the torque sensor(s) and offset adjustments can be made accordingly.

Moreover, calibration can be performed during normal operation of the vehicle. One control method employed by device controller 1007 and/or vehicle controller 1008 can include performing a calibration operation whenever it is known that more torque is being input or can be input to electronically-controlled torque transfer device 1004 than can be transmitted through a given output member without causing slippage (e.g., slippage of an electronically-controlled clutch). It will be appreciated that such calibrations can be employed to immediately re-calibrate device controller 1007 and/or the vehicle controller 1008, or could be employed to update the calibration through appropriate filtering techniques, such as low pass filtering, running averaging, weighted averaging, etc.

It will be appreciated by those of ordinary skill in the art that the actual torque values (i.e., the sensor signals) can provide real-time feedback for regulation of driveline torque and may allow vehicle control algorithms (e.g., stability control, traction control) to override various assumptions. The actual torque values may be employed in various control systems, including systems that employ PID, LMS and/or GPC control methodologies for example. Additionally or alternatively, the real-time feedback can be employed to select between model variations, such as GPC, or state-space model selection.

The real-time actual torque values can be used within a distributed control system, such as an ABS-based stability control system. Within the distributed control system, electronically-controlled torque transfer device 1004 can act as a slave module within the higher-level stability control system. As real-time actual torque values are employed (rather than predicted torque values), a relatively high degree of system accuracy can be achieved.

Figure 7:
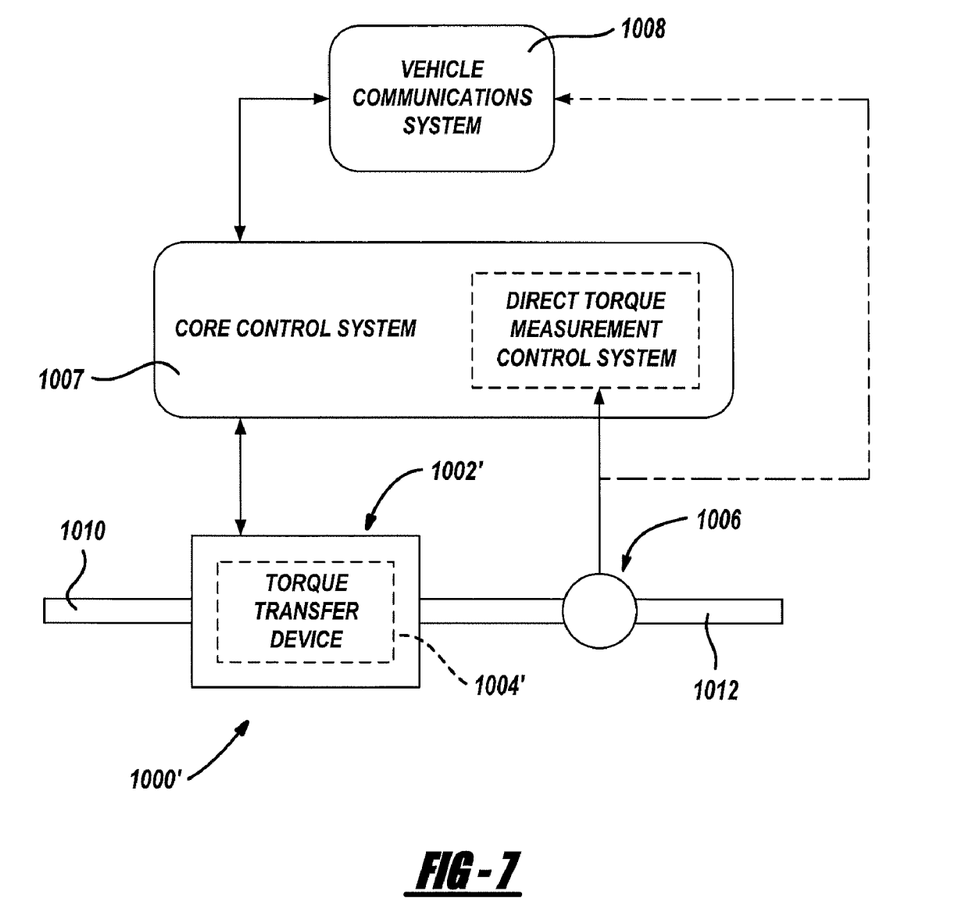

Driveline 1000' shown in FIG. 7 is generally similar to driveline 1000 of FIG. 6 except that power transfer assembly 1002' is now shown to be an in-line torque coupling instead of a transfer case. As such, torque transfer device 1004' is operable for controlling the transfer of torque from input member 1010 to output member 1012 based on torque measurements from torque sensor 1006. In all other aspects of control and function, driveline 1000' is identical to that previously described in reference to FIG. 6.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this invention, but that the scope of the present disclosure will include any embodiments falling within the foregoing description and the appended claims.

What is claimed is:

1. A transfer case for a vehicle, comprising:
    a first shaft adapted to be coupled to a first driveline;
    a second shaft adapted to be coupled to a second driveline;
    a torque transfer device including a clutch disposed between said first and second shafts and a power-operated actuator for actuating said clutch;
    a first sensor portion being formed from a magnetoelastic material and coupled to said first shaft;
    a first magnetoelastic torque sensor surrounding said first sensor portion;
    a second sensor portion being formed from a magnetoelastic material and coupled to said second shaft;
    a second magnetoelastic torque sensor surrounding said second sensor portion; and
    a control system regulating actuation of said clutch based on first torque signals from said first torque sensor and second torque signals from said second torque sensor to achieve a target torque distribution between said first and second drivelines.

2. The transfer case of claim 1 wherein said magnetoelastic material is adhesively bonded to said first and second shafts to define said first and second sensor portions.

3. The transfer case of claim 1 wherein said control system regulates the torque transferred through said clutch based on real-time feedback provided by said first and second torque sensors.

4. The transfer case of claim 1 wherein said first shaft rotates about a first rotary axis and said second shaft rotates about a second rotary axis that is offset from said first rotary axis.

5. The transfer case of claim 4 further including a transfer mechanism coupled to said second shaft and wherein said clutch is arranged to selectively couple said first shaft to said transfer mechanism.

6. The transfer case of claim 1 further comprising an inter-axle differential having an input driven by a power source, a first output coupled to said first shaft and a second output coupled to said second shaft.

7. The power transfer assembly of claim 1 wherein said first sensor portion is positioned downstream in a torque transfer path from said torque transfer device.

8. The power transfer assembly of claim 1 wherein an end of said first shaft is adapted to be coupled to said first driveline, said first sensor portion being positioned proximate said end of said first shaft.

9. A power transfer assembly for a motor vehicle, comprising:
    a rotary input member adapted to driven by a power source;
    a first rotary output member driven by said rotary input member;
    a second rotary output member;
    an intermediate rotary member concentrically positioned about and fixed for rotation with said second rotary output member;
    a torque transfer device operably disposed between said first rotary output member and said intermediate rotary member;
    a first sensor portion associated with said first rotary output member and defined by a magnetoelastic material;

a second sensor portion associated with said intermediate rotary member and defined by a magnetoelastic material;
a first torque sensor surrounding said first sensor portion;
a second torque sensor surrounding said second sensor portion; and
a control system for controlling actuation of said torque transfer device based on torque signals from said first and second torque sensors.

10. The power transfer assembly of claim 9 wherein said torque transfer device includes a clutch disposed between said first and second rotary output members and a power-operated actuator for actuating said clutch, and wherein said control system controls actuation of said actuator based on said torque signals from said first and second torque sensors.

* * * * *